United States Patent [19]

Long et al.

[11] 4,043,215

[45] Aug. 23, 1977

[54] CHAIN MASTER LINK CONSTRUCTION

[76] Inventors: Walter J. Long, 1574 Iris Way, Upland, Calif. 91786; Stephen W. Long, 10016 Santa Anita, Montclair, Calif. 91763; Robert P. Long, 1574 Iris Way, Upland, Calif. 91786

[21] Appl. No.: 683,197

[22] Filed: May 4, 1976

[51] Int. Cl.² ............................................. F16G 13/02
[52] U.S. Cl. .......................................... 74/258; 59/85
[58] Field of Search ............................... 74/258; 59/85

[56] References Cited

U.S. PATENT DOCUMENTS

| | | | |
|---|---|---|---|
| 602,633 | 4/1898 | Ecanbert | 74/258 |
| 628,386 | 7/1899 | Berry | 74/258 |
| 1,121,053 | 12/1914 | Terry | 74/258 |

*Primary Examiner*—Alan Cohan
*Attorney, Agent, or Firm*—Clarence A. O'Brien; Harvey B. Jacobson

[57] ABSTRACT

An elongated chain master link is provided including a removable side link of substantially conventional construction but provided with a transverse opening intermediate the opposite end transverse bores formed therethrough adapted to receive groove master link pin ends therethrough. A retaining clip of elongated panel-like construction is also provided and constructed of spring material such as spring steel. The clip includes opposite end transverse openings formed therethrough and one of the end openings includes communicated large and small width portions while the other opening includes communicated greater and lesser width portions. The small and lesser width portions of the end openings of the clip are spaced apart a distance equal to the spacing between the transverse bores formed through the ends of the side link and the lesser width portion opens toward the opposite end of the link into the greater width portion of the corresponding end opening while the smaller width portion opens transversely of a line extending between the clip openings into the large width portion of that opening. Further, the small and lesser width portion of the clip openings are of a size to snugly receive the grooved end portions of the master link pins therein and the longitudinal center portion of the clip includes a projection seatable in the center opening formed in the side link.

7 Claims, 5 Drawing Figures

CHAIN MASTER LINK CONSTRUCTION

BACKGROUND OF THE INVENTION

Various forms of readily removable master link constructions for drive chains have been heretofore designed and most master links are provided with readily removable clips for disassembly of the master links. However, most conventional removable clips are subject to accidental displacement from their operative positions when utilized on motorcycle chains and particularly in conjunction with motorcycle chains provided on motorcycles involved in "off-road use".

Recently there has been a considerable increase in the popularity of lighter weight motorcycles designed for use both on the road and off the road. In addition, considerable interest in motorcycles designed primarily for off-road use has also recently developed. Such motorcycles are sometimes used for pleasure and in other cases are utilized in competition races. This latter type of motorcycle is most susceptible to accidental dislodgement of a conventional master link retaining clip. In many cases a combination of various forces including vibration operating stress and contact with rocks or other debris and/or the hydraulic effect of wet sand, dirt and mud compacting about a master link retaining clip can be responsible for accidental dislodgement of the clip. Once a retaining clip of a master link is dislodged failure of the master link under stress can occur in a very short time and failure of the master link on a competition motorcycle can cause severe damage to the motorcycle, the least of which may comprise overspeeding of the motorcycle engine.

Various forms of retaining clips for chain master links have been heretofore designed for the purpose of enabling ready disassembly of the master link and other retaining clips have been designed in an attempt to insure against accidental disassembly of the master link. However, a need exists for a master link retaining clip which may be readily removed intentionally, but which includes structural features rendering it virtually impossible for the clip to become accidentally dislodged.

Examples of presently known chain master link retaining clips are disclosed in U.S. Pat. Nos. 562,364, 615,203, 628,386, 762,046 and 1,126,254.

BRIEF DESCRIPTION OF THE INVENTION

The master link construction of the instant invention utilizes a retaining clip including structural features which render it virtually impossible for the clip to become dislodged accidentally. The clip includes keyhole shaped openings formed in its opposite ends with one of the openings disposed with its greater dimension extending longitudinally of the clip and the other opening disposed with its greater dimension extending transversely of the clip. The lesser width ends of the keyhole shaped openings are provided for snugly embracing the grooved ends of the pins of a master link with the clip disposed on the outer side of the removable side link of the master link and the clip is constructed of spring metal and is provided with a central projection receivable in a central transverse opening formed through the associated removable side link of the master chain whereby the clip and removable side link may be locked against relative angular displacement about the center axis of one of the master link pins by seated engagement of the projection within the center bore or opening formed through the removable side link.

The main object of this invention is to provide a master link construction which may be readily intentionally disassembled and yet which is constructed in a manner whereby accidental disassembly of the master link will be virtually impossible.

Another important object of this invention is to provide a master link construction of improved design and including a retaining clip which will actually increase the strength of the master link under operating conditions.

Still another object of this invention is to provide a master link construction in accordance with the preceding objects and which may be utilized on substantially all forms of motorcycle drive chains and the like.

A final object of this invention to be specifically enumerated herein is to provide a master link construction in accordance with the preceding objects and which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
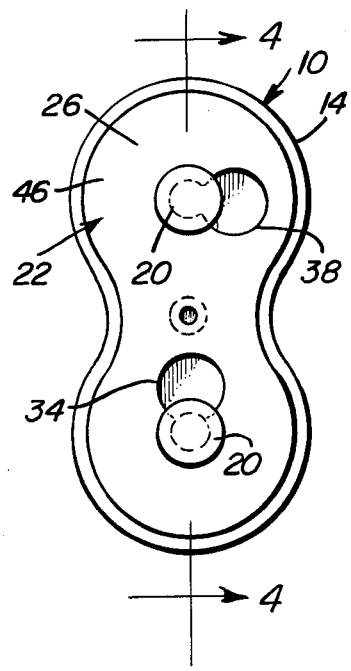
FIG. 1 is a side elevational view of the master link construction of the instant invention as seen from the removable clip side thereof.

It is generally considered throughout the motorcycle industry that the most primitive area of motorcycle design remains in the transmission of power from the engine to the rear wheel. While some motorcycle manufacturers have successfully employed the shaft drive concept of the transmission of power from the engine to the rear wheel, shaft drive systems are limited in their applications. Accordingly, the majority of motorcycle manufacturers rely on the sprocket and drive chain method of transmission of power from the engine to the rear wheel.

Although motorcycle chains are mechanically efficient and entirely suitable for the purpose originally intended, motorcycle drive chain improvements have not kept pace with modern requirements imposed by dramatic increases in motorcycle engine power and by the environment where many motorcycles are now utilized such as in "off-road races".

One area where improvement is mandatory resides in the master, or connecting, chain link retaining clip. The standard form of master link retaining clip utilized by substantially all motorcycle chain manufacturers, while configured slightly differently from one manufacturer to another, commonly presents a "hairpin" or open end design. While this type of clip is substantially wholly operative for its originally intended purpose when the attendant motorcycle is used on the street and at conventional speeds, "off-road" racing of motorcycles cause these conventional retaining clips to operate under conditions which result in the retaining clips being accidentally dislodged from their operative positions. When the retaining clip becomes dislodged the chain ends joined by the associated master link experience substantially immediate separation and the results include destruction of the motorcycle transmission and/or engine in many instances. Whipping of a chain end at high velocities can destroy a motorcycle transmission and cause the chain to jam and the rotating components of the transmission and engine to abruptly stop. The abrupt stopping of the engine components can destroy the engine and the jamming of the chain can also cause the rear wheel of the motorcycle to lock and an accident to occur with possible injury or death of the rider or a bystander of a race in which the motorcycle was competing.

The master link construction of the instant invention is referred to in general by the reference numeral 10 and includes a pair of opposite side links 12 and 14. The side link 12 includes a pair of opposite end transversely projecting pins 16 and the outer ends of the pins 16 include circumferential grooves 18 thereby defining heads or abutments 20 on the outer ends of the pins 16.

The side link 14 has a pair of opposite end bores (not shown) formed therethrough and the free ends of the pins 16 project through these bores with the grooves 18 disposed immediately outwardly of the outer side of the removable side link 14. It will be understood that the foregoing description of the master link 10 comprises a conventional master link and that the usual open end "hairpin" type of retaining clip is conventionally applied to the outer side of the removable side link 14 and engaged with the grooves 18.

The retaining clip of the instant invention is referred to in general by the reference numeral 22 and is of generally the same plan shape as the side link 14. However, the retaining clip 22 is of slightly smaller dimensions than the side link 14.

The clip 22 comprises a panel-like body 24 constructed of spring metal or the equivalent and the enlarged opposite end portions 26 and 28 of the body 24 include keyhole shaped openings 30 and 32 formed therethrough. The opening 32 includes large and small width end portions 34 and 36 while the opening 30 includes greater and lesser width end portions 38 and 40. The keyhole shaped opening 32 extends longitudinally of the body 24 and the keyhole shaped opening 30 extends transversely of the body 24. The small width portion 36 opens toward the opening 30 into the large width portion 34 and the lesser width portion opens transversely of the longitudinal centerline of the body 24 into the greater width portion 38, the spacing between the small and lesser width portions 36 and 40 being equal to the spacing between the grooved portions 18 of the pins 16.

The longitudinal central area of the removable side link 14 includes a transverse opening 44 formed therethrough and the central portion of the inner side 46 of the body 24 includes an integral projection 48 which projects outwardly from the inner side 46 at generally right angles relative thereto.

Figure 2:
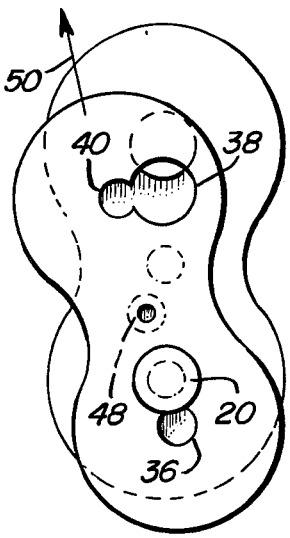
FIG. 2 is a side elevational view of the master link construction with the retaining clip thereof in an initially installed position.

In operation, after the master link 10 has been assembled in connecting the ends of a motorcycle chain together to the extent that the side link 14 has been placed over the free ends of the pins 16, the clip 22 is initially positioned so as to receive a first head 20 through the large width portion 34 with the side 46 of the body 24 opposing the link 14, see FIG. 2. Then, the body 24 is shifted in the direction of the arrow 50 in FIG. 2 so that the grooved end portion 18 of the pin projecting through the large width portion 34 is seated in the small width portion 36. Then, the unsecured end of the body 24 (the latter being flexed due to the engagement of the projection 48 with the outer side of the link 14) is rotated to the position thereof illustrated in FIG. 3 of the drawings with the other head 20 registered with the greater width portion 38 of the opening 30, the end portion 26 being spaced outwardly of the corresponding head 20. Thereafter, the end portion 26 is inwardly displaced toward the link 14 whereby the central portion of the body 24 is arched. When the end portion 26 has been displaced sufficiently inwardly to project the second head 20 completely through the greater width portion 38 of the opening 30, the body 24 is then swung in the direction of the arrow 52 in FIG. 3 so as to cause the second grooved portion 18 to be seated in the lesser width portion 40 of the opening 30. At this point, the projection 48 is registered with the opening 44 and may thus seat within the outer end of the opening 44 allowing the body 24 to return to its normally planar condition such as that illustrated in FIG. 4.

Figure 3:
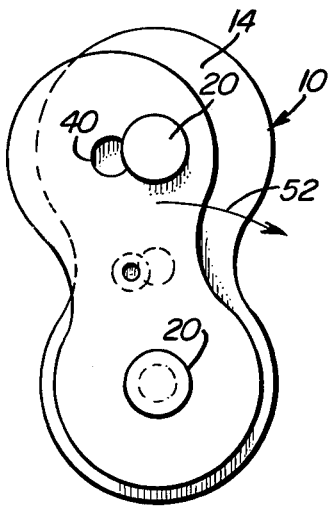
FIG. 3 is a further side elevational view of the master link construction with the retaining clip in a second position of installment.
Figure 4:
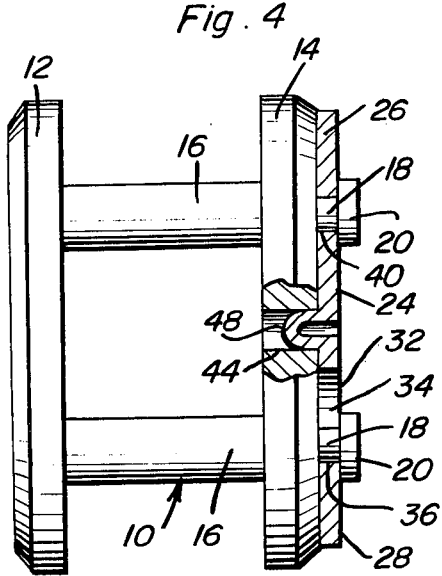
FIG. 4 is an elevational view of the master link with the retaining clip in a fully installed position, the retaining clip being illustrated in section taken substantially upon the plane indicated by the section line 4—4 of FIG. 1 and a central portion of the removable side link of the master link being broken away and illustrated in section.
Figure 5:
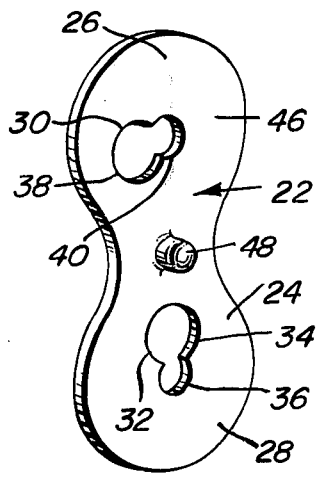
FIG. 5 is a perspective view of the retaining clip.

Once the clip 22 has thus been installed, the clip 22 cannot be removed until the central portion thereof is outwardly displaced sufficient to withdraw the projection 48 from the opening 44 and the clip is thereafter angularly displaced to the position thereof illustrated in FIG. 3.

It has been found that vibration, driving stresses and the hydraulic effect of sand, dirt and/or mud and/or a combination of all of these operating conditions in conjunction with the impact of rocks or other debris with the clip 22 are ineffective to cause accidental disengagement of the retaining clip 22. However, by the insertion of a small tip of any handtool in the rear side of the opening 44 the projection 48 may be forced out of the outer end of the opening 44 and the clip body 22 may be rotated to the position thereof illustrated in FIG. 3 for disassembly of the master link 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated master link side link having a pair of transverse bores formed through its opposite end portions adapted to receive the free circumferentially grooved ends of a pair of master link pins therethrough, and an elongated retaining clip adapted for engagement over said side link and with the extended grooved ends of said pins for retaining said side link on said pins, one end of said clip including first means defining a first opening formed therethrough including communicated large and small width portions, said large width portions being adapted to axially receive one of said pin ends therethrough, said small width portion opening toward the other end of said clip into said large width portion and adapted to snugly and seatingly receive the grooved portion of said one pin therein, the other end of said clip including means defining a second opening formed therethrough including communicated greater and lesser width portions, said greater width portion being adapted to axially receive the other of said pin ends therethrough, said lesser width portion opening in a direction transverse to the longitudinal extent of said clip into said greater width portion, said second opening being spaced toward said other end of said clip from said first opening, said clip being positionable, relative to said link, in predetermined position with said small and lesser width portions registered with said bores, and said clip and link including coacting means releasably retaining said clip against angular displacement relative to said link about an axis extending centrally through said small width portion of said first opening.

2. The combination of claim 1 wherein said coacting means including transversely projecting and opening projection and recess means, registered with each other when said clip is in said predetermined position, carried by and formed in said clip and link, said clip being constructed of stiff, but flexible and resilient material.

3. The combination of claim 2 wherein said projection and recess means are defined centrally intermediate said bores and openings.

4. The combination of claim 3 wherein said recess means is defined by said side link and said projection means is defined by said clip.

5. The combination of claim 4 wherein said clip is defined by a plate member, said openings comprising generally key-shaped openings formed through said plate member.

6. The combination of claim 5 wherein said projection means comprises a laterally displaced portion of said plate member.

7. The combination of claim 6 wherein said recess means comprises a third opening formed transversely through said side link, thereby enabling access to said projection means through the end of said third opening remote from said plate member.

* * * * *